Patented Mar. 12, 1946

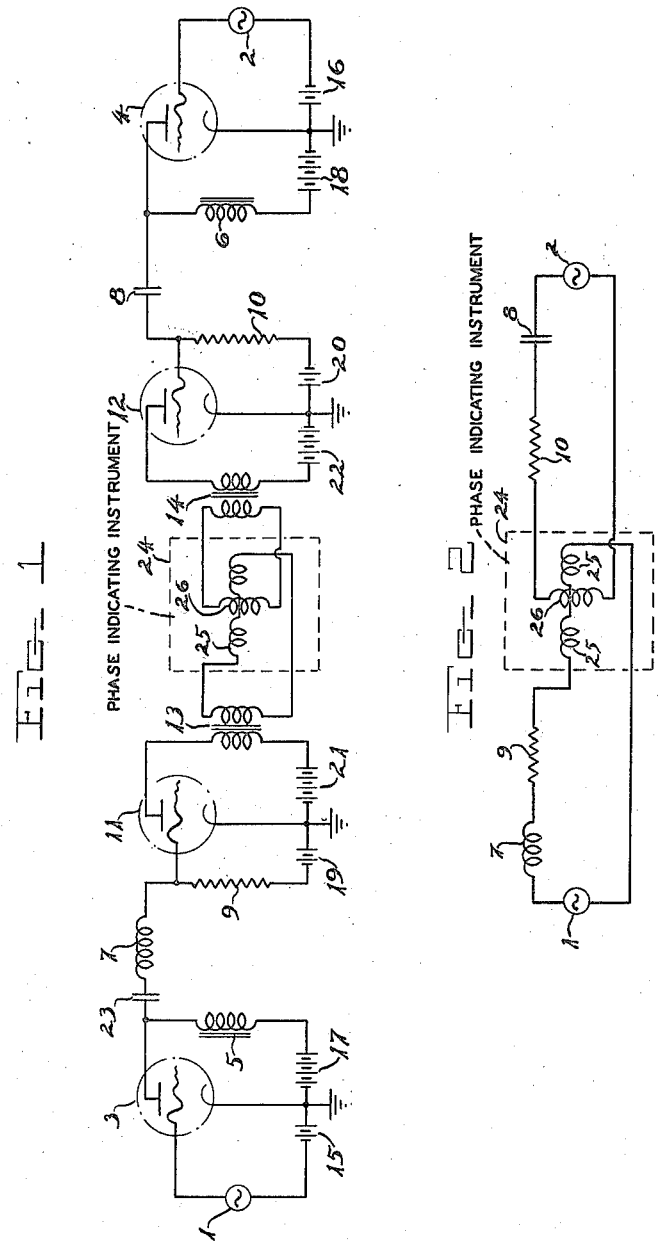

2,396,253

UNITED STATES PATENT OFFICE 2,396,253

PHASE INDICATING CIRCUIT

Edward N. Dingley, Jr., Arlington, Va.

Application December 1, 1937, Serial No. 177,485

8 Claims. (Cl. 172—245)

(Granted under the act of March 3, 1883, as amended April 30, 1928; 370 O. G. 757)

This invention relates to means for indicating phase relations between two electric currents of the same frequency, and has for its principal object to provide means for indicating the existence of, or lack of, phase equality between two sources of audio frequency voltage having equal but variable frequencies and, if lack of phase equality exists, for indicating which source of voltage leads the other in phase.

In the drawing:

Fig. 1 is a diagrammatic representation of a system embodying the present invention;

Fig. 2 is a simplified diagram showing the principle of my invention.

The following description demonstrates that when using the circuit of Fig. 1, the torque tending to displace the pointer of the indicating instrument 24 from its zero-center position is proportional to the trigonometric sine of the angle representing the phase difference between the voltage at source 1 and the voltage at source 2 regardless of the absolute frequency of the two sources having identical frequency. The torque may be positive or negative (right or left) depending upon whether the phase difference is positive or negative, and will be zero when the phase difference is zero regardless of the absolute magnitudes or relative magnitudes of the voltage sources.

It will be demonstrated that the primary requirements which must be fulfilled in order for the circuit of Fig. 1 to accomplish the aforesaid results are as follows:

(a) The ratio of the inductance of inductor 7 to the capacitance of capacitor 8 must equal the square of the resistance of the resistor 9 or of resistor 10, the resistances of which are equal.

(b) The remainder of the circuits to the right and left of the instrument 24 must be symmetrical.

Fig. 1 diagrammatically shows in combination the following conventional apparatus: The sources of audio frequency voltage of like frequency 1 and 2, the vacuum tubes 3 and 4 having their input circuits respectively connected thereto; the grid bias sources 15 and 16 and the anode potential sources 17 and 18 for the tubes 3 and 4; the inductors 5 and 6 in the respective plate supply leads, and the inductor 7 and capacitor 8 respectively connecting the outputs of tubes 3 and 4 to the inputs of tubes 11 and 12. The resistors 9 and 10 and the grid bias sources 19 and 20 are in the input circuits of tubes 11 and 12 and the anode potential sources for these tubes are designated by 21 and 22 respectively. Transformers 13 and 14 connect the outputs of tubes 11 and 12 to the stator winding 25 and the rotor winding 26 of zero-center dynamometer type indicating instrument 24. Numeral 23 designates a blocking capacitor between tubes 3 and 11.

In Fig. 1, the inductors 5 and 6 provide low impedance paths through which the anode potentials 17 and 18 may reach the anodes of vacuum tubes 3 and 4. The inductances of inductors 5 and 6 are chosen to be so large that their reactances at any audio frequency within the range utilized will not appreciably alter the power factor of the load circuits connected to the anodes of vacuum tubes 3 and 4.

The grids of vacuum tubes 11 and 12 are energized by the audio frequency voltage drops across resistors 9 and 10. The power outputs of vacuum tubes 11 and 12 are conducted by way of the isolating transformers 13 and 14 respectively to the stator winding 25 and the rotor winding 26 of the zero-center dynamometer type electrical indicating instrument 24. The vacuum tubes 11 and 12 are identical, the transformers 13 and 14 are identical and the stator 25 and the rotor 26 have identical impedances and therefore the phase difference between the currents flowing in stator 25 and rotor 26 will be identical to the phase difference of the audio frequency voltages existing across resistors 9 and 10.

Capacitor 23 is used only to isolate the direct anode potential of vacuum tube 3 from the circuit of inductor 7 and resistor 9. The capacitance of capacitor 23 is chosen to be so large that its reactance at any audio frequency within the range utilized will be negligible compared to the reactance of inductor 7. The reactance of capacitor 23 consequently will be neglected in the following analysis of the operation of the circuit.

Let $R_p$ represent the plate resistance of vacuum tube 3 or vacuum tube 4. This equality is obtained by utilizing identical tubes with identical operating potentials. The other symbols used are defined as follows:

$R_b$ = the resistance of resistor 9 or of resistor 10.
$R = R_p + R_b$.
$L$ = the inductance of inductor 7.
$C$ = the capacitance of capacitor 8.
$\omega = 2\pi f$.
$f$ = any audio frequency.

$Z_1 = \sqrt{R^2 + \omega^2 L^2}$ $$Z_2 = \sqrt{R^2 + \frac{1}{\omega^2 C^2}}$$

$$\phi_1 = \tan^{-1} \frac{\omega L}{R}$$

$$\phi_2 = \tan^{-1} \frac{1}{\omega C R}$$

$i_1$ = instantaneous value of current through resistor 9.
$i_2$ = instantaneous value of current through resistor 10.
$E_1 \sin \omega t$ = instantaneous voltage of source 1.
$E_2 \sin (\omega t + \alpha)$ = instantaneous voltage of source 2.
$\alpha$ = the phase angle by which source 2 leads source 1.
$\mu$ = amplification factor of vacuum tubes 3 and 4.
$e_1 = i_1 R_b$.
$e_2 = i_2 R_b$.
$i_3$ = current through stator 25.
$i_4$ = current through rotor 26.
$\theta$ = the phase angle by which $i_3$ lags $e_1$ and also the phase angle by which $i_4$ lags $e_2$. This equality is obtained by utilizing impedances from resistor 9 to and including stator 25 which are identical to the impedances from resistor 10 to and including rotor 26.
$K = i_3/e_1 = i_4/e_2$.
$Q = K \mu R_b$.
$s$ = instantaneous torque between stator 25 and rotor 26 = $i_3 \times i_4 \times M$, where M is a constant.

$$S = \frac{\omega}{2\pi} \int_0^{\frac{2\pi}{\omega}} s\, dt = \text{average torque}.$$

The following circuit equations are then obtained:

$$i_1 = \frac{u E_1}{Z_1} \sin(\omega t - \phi_1)$$

$$i_2 = \frac{u E_2}{Z_2} \sin(\omega t + \phi_2 + \alpha)$$

$$e_1 = \frac{u E_1 R_b}{Z_1} \sin(\omega t - \phi_1)$$

$$e_2 = \frac{u E_2 R_b}{Z_2} \sin(\omega t + \phi_2 + \alpha)$$

$$i_3 = \frac{K u E_1 R_b}{Z_1} \sin(\omega t - \phi_1 - \theta)$$

$$i_4 = \frac{K u E_2 R_b}{Z_2} \sin(\omega t + \phi_2 - \theta + \alpha)$$

$$i_3 = \frac{Q E_1}{Z_1} \sin(\omega t - \phi_1 - \theta)$$

$$i_4 = \frac{Q E_2}{Z_2} \sin(\omega t + \phi_2 - \theta + \alpha)$$

$$s = M i_3 i_4 = \frac{M Q^2 E_1 E_2}{Z_1 Z_2}(\sin(\omega t - \phi_1 - \theta)\sin(\omega t + \phi_2 - \theta + \alpha))$$

$$s = \frac{M Q^2 E_1 E_2}{2 Z_1 Z_2}(\cos(\phi_1 + \phi_2 + \alpha) - \cos(2\omega t - \phi_1 + \phi_2 - 2\theta + \alpha))$$

$$S = \frac{M Q^2 E_1 E_2}{2 Z_1 Z_2}(\cos(\phi_1 + \phi_2 + \alpha))$$

$$S = \frac{M Q^2 E_1 E_2}{2 Z_1 Z_2}(\cos\phi_1 \cos(\phi_2 + \alpha) - \sin\phi_1 \sin(\phi_2 + \alpha))$$

$$S = \frac{M Q^2 E_1 E_2}{2 Z_1 Z_2}\left(\frac{\left(R^2 - \frac{L}{C}\right)\cos\alpha}{Z_1 Z_2} - \frac{R\left(\omega L + \frac{1}{\omega C}\right)\sin\alpha}{Z_1 Z_2}\right)$$

If $R^2$ is made equal to $\frac{L}{C}$ then $\left(R^2 - \frac{L}{C}\right) = 0$ and $$\frac{R\left(\omega L + \frac{1}{\omega C}\right)}{Z_1 Z_2} = \frac{R\left(\omega L + \frac{1}{\omega C}\right)}{\sqrt{\left(R^2 + \omega^2 L^2\right)\left(R^2 + \frac{1}{\omega^2 C^2}\right)}} =$$

$$\frac{R\left(\omega L + \frac{1}{\omega C}\right)}{\sqrt{R^4 + \frac{L^2}{C^2} + R^2 \omega^2 L^2 + \frac{R^2}{\omega^2 C^2}}} = \frac{R\left(\omega L + \frac{1}{\omega C}\right)}{\sqrt{R^2 \frac{L}{C} + R^2 \frac{L}{C} + R^2 \omega^2 L^2 + \frac{R^2}{\omega^2 C^2}}} =$$

$$\frac{\omega L + \frac{1}{\omega C}}{\sqrt{\omega^2 L^2 + 2\frac{1}{C} + \frac{1}{\omega^2 C^2}}} = \frac{\omega L + \frac{1}{\omega C}}{\omega L + \frac{1}{\omega C}} = 1$$

then:

$$S = \frac{M Q^2 E_1 E_2}{2 Z_1 Z_2} \sin \alpha$$

$$S = \frac{M Q^2 E_1 E_2}{2 R \left(\omega L + \frac{1}{\omega C}\right)} \sin \alpha$$

Thus the torque S is made proportional to the trigonometric sine of the angle $\alpha$. If $\alpha$ is zero then the torque becomes zero regardless of the value of $E_1$, $E_2$, or $\omega$. If $\alpha$ is positive the torque will be positive. If $\alpha$ is negative the torque will be negative. If $\alpha$ is finite the torque will be proportional to the product $E_1 \times E_2$, inversely proportional to R and inversely proportional to $$\omega L + \frac{1}{\omega C}$$

It will be noted that the first derivative of $$\omega L + \frac{1}{\omega C}$$

with respect to $\omega$ is zero when $$LC = \frac{1}{\omega^2}$$

that is the rate of change of torque S with frequency will be least when the operating frequency has a value most nearly equal to the reciprocal of the quantity $$2\pi \sqrt{LC}$$

In consequence, to obtain the greatest constancy of torque with respect to frequency, it is desirable to choose L and C so that their product equals $$\frac{1}{(2\pi f_0)^2}$$

where $f_0$ equals the mean of the range of audio frequencies utilized.

Fig. 2 depicts a simplification of Fig. 1 wherein the vacuum tubes have been eliminated. The mode of operation of the circuit of Fig. 2 is the same as that described in connection with Fig. 1 except that in Fig. 2 the reactance of the stator 25 and of the rotor 26 of the dynamometer type instrument 24 must at all times be negligible compared to the reactance of inductor 7 and compared to the reactance of capacitor 8 and except that the impedances of source 1 and source 2 of Fig. 2 must be equal. In Fig. 1 the vacuum tubes are used as isolating elements, or buffer stages, in order that the impedances of the sources 1 and 2 and of the instrument 24 will not adversely affect the phase determining circuits containing inductor 7 and resistor 9 in the one case and containing capacitor 8 and resistor 10 in the other case.

The invention herein described and claimed may be used and/or manufactured by or for the Government of the United States of America for governmental purposes without the payment of any royalties thereon or therefor.

I claim:

1. Apparatus as described comprising a first circuit including an inductor and a resistor in series, a second circuit including a capacitor and a resistor in series, the said resistors having identical resistances and the ratio of the inductance of the inductor to the capacitance of the capacitor being equal to the square of the resistance of either resistor, and an indicating instrument connected to be actuated by the interaction of the respective currents from said circuits.

2. Apparatus as described comprising a first circuit including a vacuum tube, suitable potential sources for operating said tube and a load network for said tube consisting of an inductor and a resistor in series; a second circuit comprising a second vacuum tube, suitable potential sources for operating said second tube, and a load network for said second tube consisting of a capacitor and a resistor in series, the said resistors having identical resistances, the said vacuum tubes having identical plate resistances, and the ratio of the inductance of the said inductor to the capacitance of the said capacitor being equal to the square of the sum of the resistance of either of said resistors and the resistance of the plate circuit of either of said vacuum tubes, and an indicating instrument connected to be actuated by the interaction of the currents from said circuits.

3. Apparatus as described comprising a first circuit including a first vacuum tube, suitable potential sources for operating said tube, a load network for said tube consisting of an inductor and a resistor in series, a second vacuum tube, suitable potential sources for operating said second tube, the grid-cathode circuit of said second tube being connected in parallel with the resistor of the load network of the first vacuum tube and a load circuit for said second tube consisting of a transformer, and an instrument capable of indicating phase difference having one pair of terminals connected to said transformer; a second circuit including a third vacuum tube, suitable potential sources for operating said third tube, a load network for said third tube consisting of a capacitor and a resistor in series, a fourth vacuum tube, suitable potential sources for operating said fourth tube, the grid-cathode circuit of said fourth tube being connected in parallel with the resistor of the load circuit of the third vacuum tube, and a transformer connecting the output of said fourth tube to another pair of terminals of said indicating instrument.

4. Apparatus as described, comprising an instrument capable of indicating the phase relation between two alternating voltages of equal frequency, two sources of alternating voltage of equal audio frequency, means including a capacitor and a resistor in series operatively connecting one of said sources to said instrument, and means including an inductor and a resistor operatively connecting the other of said sources to said instrument, the resistances in said connecting means being equal and the square of either of said resistances being equal to the ratio of the inductance of said inductor to the capacitance of said capacitor.

5. Apparatus as described, comprising an instrument capable of indicating the phase relation between two alternating voltages of equal frequency, two sources of alternating voltages of equal frequency, means including a capacitor and a resistor in series operatively connecting one of said sources to said instrument, and means including an inductor and a resistor operatively connecting the other of said sources to said instrument, the resistances in said connecting means being equal and the square of either of said resistances being equal to the ratio of the inductance of said inductor to the capacitance of said capacitor.

6. Apparatus as described, comprising an instrument capable of indicating the phase relation between two alternating voltages of equal frequency, two sources of alternating voltage of equal frequency, means including a capacitor and a resistor in series operatively connecting one of said sources to said instrument, and means including an inductor and a resistor operatively connecting the other of said sources to said instrument, the resistances in said connecting means being equal and the square of either of said resistances being equal to the ratio of the inductance of said inductor to the capacitance of said capacitor, each of said means further including an isolating device to prevent an impedance in said instrument from reacting upon the above mentioned elements in the respective said means.

7. Apparatus as described, comprising two sources of alternating voltage of equal frequency, means connected to one of said sources to shift the phase of the current with respect to the voltage, means connected to the other said source to cause an opposite shift of the current with respect to the voltage so that the total relative phase shift of the currents from the two sources is 90°, an isolating device respectively connected to each of said means, and an indicating device connected to both said isolating devices to indicate the phase relation between the two currents.

8. Apparatus as described, comprising two sources of alternating voltage of equal frequency, means connected to one of said sources to shift the phase of the current with respect to the voltage, means connected to the other of said sources to cause an opposite shift of the current with respect to the voltage so that the total relative phase shift of the currents from the two sources is 90°, and means operatively connected to both of said means to indicate the phase relation between said currents.

EDWARD N. DINGLEY, Jr.